US012780082B2

(12) United States Patent
Pellarin et al.

(10) Patent No.: US 12,780,082 B2
(45) Date of Patent: Nov. 3, 2026

(54) LIGHTING SYSTEM FOR A MOTOR VEHICLE

(71) Applicant: VALEO VISION, Bobigny (FR)

(72) Inventors: Marie Pellarin, Bobigny (FR); Sophie Cladé, Bobigny (FR); Arnaud Robert, Bobigny (FR)

(73) Assignee: Valeo Vision, Bobigny (FR)

( * ) Notice: Subject to any disclaimer, the term of this patent is extended or adjusted under 35 U.S.C. 154(b) by 57 days.

(21) Appl. No.: 18/833,477

(22) PCT Filed: Jan. 30, 2023

(86) PCT No.: PCT/EP2023/052211
§ 371 (c)(1),
(2) Date: Jul. 26, 2024

(87) PCT Pub. No.: WO2023/144398
PCT Pub. Date: Aug. 3, 2023

(65) Prior Publication Data
US 2025/0153630 A1 May 15, 2025

(30) Foreign Application Priority Data
Jan. 31, 2022 (FR) ...................................... 2200861

(51) Int. Cl.
*B60Q 1/14* (2006.01)
*H05B 47/155* (2020.01)

(52) U.S. Cl.
CPC ......... *B60Q 1/1423* (2013.01); *H05B 47/155* (2020.01)

(58) Field of Classification Search
CPC .... B60Q 2300/122; B60Q 1/085; B60Q 1/12; B60Q 2300/112; B60Q 1/143;
(Continued)

(56) References Cited

U.S. PATENT DOCUMENTS 6,960,005 B2 * 11/2005 Daicho .................. B60Q 1/085 362/465
7,195,378 B2 3/2007 Fukawa et al.
(Continued)

FOREIGN PATENT DOCUMENTS

DE 102006043281 A1 3/2008
DE 102007038077 A1 2/2009
(Continued)

OTHER PUBLICATIONS

Japan Patent Office, Office Action (with English translation) of corresponding Japanese Patent Application No. 2024-545252, dated Aug. 1, 2025, 10 pages.
(Continued)

*Primary Examiner* — Wei (Victor) Y Chan
(74) *Attorney, Agent, or Firm* — Valeo Vision

(57) ABSTRACT

The invention relates to a lighting system for a motor vehicle. The system includes a first headlamp capable of projecting a first light beam and a second headlamp capable of projecting a second light beam, the first light beam being formed by at least one first focused light beam and the second light beam being formed by at least one second focused light beam. The first and second focused light beams being controlled by a control law. The control law is configured to create asymmetry between the angular displacement of the first focused light beam from a first outer end position to a first inner end position and the angular displacement of the second focused light beam from a second outer end position to a second inner end position.

19 Claims, 9 Drawing Sheets

(58) Field of Classification Search
CPC .......... B60Q 2300/056; B60Q 2300/41; B60Q 2300/42; B60Q 2300/054; B60Q 1/18; B60Q 2300/45
See application file for complete search history.

(56) References Cited

U.S. PATENT DOCUMENTS

| | | | | |
|---|---|---|---|---|
| 7,226,193 | B2 | 6/2007 | Bahnmüller et al. | |
| 10,632,896 | B2 | 4/2020 | Roels et al. | |
| 10,752,162 | B2 | 8/2020 | Gutjahr et al. | |
| 2004/0052083 | A1* | 3/2004 | Daicho | B60Q 1/085 362/465 |
| 2005/0117358 | A1* | 6/2005 | Fukawa | B60Q 1/16 362/460 |
| 2015/0009694 | A1 | 1/2015 | Sekiguchi et al. | |
| 2017/0282783 | A1* | 10/2017 | Ravier | B60Q 1/143 |
| 2018/0180242 | A1* | 6/2018 | Na | F21S 41/43 |
| 2018/0180243 | A1* | 6/2018 | Na | B60Q 1/02 |
| 2018/0180246 | A1* | 6/2018 | Na | F21S 41/663 |
| 2018/0372303 | A1* | 12/2018 | Na | B60K 35/28 |
| 2019/0017675 | A1* | 1/2019 | Suwa | F21S 41/24 |
| 2019/0299483 | A1* | 10/2019 | Dawidziak | B27F 1/06 |
| 2019/0299843 | A1* | 10/2019 | Roels | B60Q 1/08 |
| 2019/0359120 | A1 | 11/2019 | Furugori | |

FOREIGN PATENT DOCUMENTS

| | | | |
|---|---|---|---|
| DE | 102009023827 | A1 | 12/2010 |
| EP | 2821282 | A2 | 1/2015 |
| EP | 3550204 | A1 | 10/2019 |
| FR | 2839688 | A1 | 11/2003 |
| FR | 2857309 | A1 | 1/2005 |
| FR | 3082918 | A1 | 12/2019 |
| JP | 20150-13512 | A | 1/2015 |
| JP | 2019169330 | A | 10/2019 |
| JP | 2019-202656 | A | 11/2019 |

OTHER PUBLICATIONS

European Patent Office, International Search Report (with English translation) and Written Opinion of corresponding International Application No. PCT/EP2023/052211, dated Mar. 20, 2023.

* cited by examiner

LIGHTING SYSTEM FOR A MOTOR VEHICLE

TECHNICAL FIELD

The present invention relates to the field of lighting for automotive vehicles, and more specifically to the directional lighting functions for illuminating the inside of a corner.

BACKGROUND OF THE INVENTION

Automotive vehicles are equipped with headlamps intended to illuminate the road in front of the vehicle, at night or in the event of reduced luminosity. These headlamps comprise one or more luminous modules that are controlled in order to generate two lighting modes, a first "high beam" mode and a second "low beam" mode. The "high beam" mode allows the road in front of the vehicle, as well as verges, to be satisfactorily illuminated with a high luminous intensity when the road is straight. The "low beam" mode allows the road in front of the vehicle to be illuminated with a lower luminous intensity, but that nevertheless offers good visibility, without dazzling the other road users. Under traffic conditions where the roadway is shared by multiple vehicles, said vehicles use the "low beam" mode to avoid dazzling the other road users. During a change of direction, notably in a corner, the light beams projected in either of the lighting modes, and notably in the "low beam" mode, may not allow the verge inside the corner to be sufficiently illuminated in order for the driver of the vehicle to avoid a potential danger.

It is known for the light beam of a low beam to be split into a wide lighting zone with cut-off, forming a lower portion of the beam that is referred to as "flat" portion and is aimed at broadly illuminating the road scene under a horizon line formed by a horizontal cut-off of this lighting zone so as to avoid dazzling other users of the road scene, and a more restricted focused lighting zone that is referred to as "kink" portion, at least partly disposed above this horizon line and laterally on either side of a median longitudinal axis of the vehicle when the vehicle is traveling in a straight line. This focused lighting zone notably has a cut-off edge, substantially perpendicular to the horizontal cut-off of the "flat" portion or inclined relative to this horizontal cut-off, which laterally delimits the "kink" portion on the driver side and vehicles likely to be traveling in a lane in the opposite direction to that in which the vehicle is traveling.

Moreover, it is known for the headlamps of the vehicle to be configured so that they can fulfil a directional lighting function, also known as "DBL" for "Dynamic Bending Light", by angularly moving the emitted light beam as a function of the steering wheel angle in order to ensure optimal lighting of the verge when changing the trajectory of the vehicle. Notably, it is known for such a directional lighting function to be implemented mechanically by pivoting the entire module generating the low beam or the high beam to the left or to the right depending on the direction of the corner.

Thus, when a vehicle equipped with a directional lighting function negotiates a corner, the entire light beam forming the low beam is likely to pivot toward the inside of the corner. The orientation of the lower portion of the beam, i.e., the beam with wide cut-off forming the "flat" portion, toward the inside of the corner allows the verge forming the inside of the corner to be illuminated, while the orientation of the upper portion of this beam, i.e., the focused beam forming the "kink" portion, toward the inside of the corner for its part allows the roadway to be effectively illuminated by following the curve thereof in the corner.

When a luminous module comprises a plurality of luminous sources involved in generating beam portions forming pixels of the overall emitted light beam, a decision may be taken to implement the directional lighting function digitally, by activating or deactivating the luminous sources in order to orient the light beam without pivoting the module. A control law is configured to control the activation and the deactivation of the luminous sources in order to modify the extent and the angular orientation of the light beams thus formed exiting the headlamps.

The aforementioned focused lighting zone, or "kink" portion, can be generated by high-definition luminous sources, i.e., with greater definition than that of the sources associated with the lighting zone with wide cut-off, so that the wide lighting zone with cut-off can be defined as a diffuse lighting zone. Throughout the present disclosure, the terms "with wide cut-off" and "wide with cut-off" are used synonymously.

Combining a digital directional light beam and a focused lighting zone generated by high-definition luminous sources, limiting the angular extent of this focused lighting zone forming the "kink" portion, can generate, when angularly pivoting the light beams generated by the headlamps and notably when pivoting when cornering on the side opposite the driver, a discontinuity in the light beam for lighting the road in the vicinity of the focused lighting zone, which can hinder the driver.

SUMMARY OF THE INVENTION

The present invention proposes overcoming these various constraints, and notably the discontinuity of the light beam, by means of a luminous system for an automotive vehicle comprising a first headlamp intended to be mounted on a first side of the automotive vehicle and able to project a first light beam and a second headlamp intended to be mounted on a second side of the automotive vehicle and able to project a second light beam, with the first and second light beams being complementary so as to form a light beam for lighting a road, with the light beam being controlled by a control law, each headlamp comprising a means for projecting a wide light beam with cut-off and a pixelated projection means for a focused light beam, with at least the pixelated projection means comprising a plurality of selectively activatable luminous sources, the first light beam being formed by a first focused light beam having a first optical axis and a first wide light beam with cut-off, the second light beam being formed by a second focused light beam having a second optical axis and a second wide light beam with cut-off, with at least the first focused light beam being digitally controlled by the control law in order to pivot between a first outer end position and a first inner end position, with at least the second focused light beam being digitally controlled by the control law in order to pivot between a second inner end position and a second outer end position, characterized in that the control law is configured to generate asymmetry between, on the one hand, the angular displacement of the first focused light beam from the first outer end position to the first inner end position relative to the first optical axis and, on the other hand, the angular displacement of the second focused light beam from the second outer end position to the second inner end position relative to the second optical axis. According to the invention, the control law is configured to generate asymmetry, relative to a central longitudinal axis of the luminous system according to the invention, between the angular displacement of the first focused light beam from the first outer end position to the first inner end position and the angular displacement of the second focused light beam from the second outer end position to the second inner end position.

The digital directional lighting function, implemented by pixelated projection means within automotive vehicle headlamps, is controlled by a control law implemented in control units of the vehicle. This control law allows the orientation of the first and second focused light beams to be controlled by activating or deactivating the luminous sources that allow these focused light beams to be generated. According to the invention, during a change of trajectory of the automotive vehicle in a corner oriented toward the second side, i.e., toward the side opposite the driver, the displacement of the first focused light beam is controlled so that the angular range of digital pivoting of the first focused light beam is different from that relating to the displacement of the second focused light beam during a change of trajectory of the automotive vehicle in a corner oriented toward the first side, i.e., on the driver side. This asymmetry prevents the first inner end position of the first pixelated light beam and the second outer end position of the second pixelated light beam from being too far apart from one another in the second position of the light beam when negotiating a corner oriented toward the second side, so that the driver of the automotive vehicle observes, during changes of direction and during corresponding pivoting of the light beam, a substantially continuous focused light beam formed by the first and second focused light beams.

These angular end positions specific to each pixelated light beam are defined relative to an optical axis specific to the headlamp configured to project said pixelated light beam. The optical axis is defined by the nominal orientation of the beam, for lighting a straight road, i.e., without any information relating to a corner. In this nominal orientation, notably, each headlamp is configured so that the corresponding optical axis is substantially parallel to a central longitudinal axis of the luminous system, on either side of which the two headlamps are arranged, with this central longitudinal axis of the luminous system notably being able to be coincident with the median longitudinal axis of the vehicle. The optical axis is located, for example, in the vicinity of the, or of one of the, luminous sources of the headlamp. It notably can come into abutment at the center of the plurality of selectively activatable luminous sources.

The luminous system can have one or more of the following features, taken alone or in combination.

The wide beam with cut-off has a substantially straight cut-off, notably a horizontal cut-off, when the respective headlamp of the luminous system is in its normal operating position.

The horizontal cut-offs of the first and second wide beams with cut-off are aligned so as to form an overall horizontal cut-off.

The wide beam with cut-off can, according to the invention, be formed by a diffuse beam or a pixelated beam, but it should be noted that this wide beam with cut-off, if it is pixelated, has low resolution, for example, with pixel sizes that are such that their angular field is greater than 5°. The need to modify the control law is more specifically useful for the focused light beam lighting the road scene above the horizontal cut-off of the beam with wide cut-off, insofar as the associated pixelated projection means have a higher resolution with pixels whose angular field is less than 2° or 3°, and therefore insofar as the focused light beam has a narrowed field of illumination.

Each of the focused light beams has a cut-off edge, which can be inclined relative to the corresponding optical axis of the headlamp and the angular position of the focused light beam is defined by the position of this cut-off edge relative to the corresponding optical axis.

Each of the focused light beams has a cut-off edge, which can be inclined relative to the cut-off of the corresponding wide beam with cut-off of the headlamp and the angular position of the focused light beam is defined by the position of this cut-off edge, notably by the position of the intersection of this cut-off edge with the cut-off of the corresponding wide beam with cut-off, relative to the corresponding optical axis.

Throughout the present disclosure, when a feature is described for a cut-off edge that is inclined relative to the corresponding optical axis of the headlamp, the same feature also can be applied to a cut-off edge that is inclined relative to the cut-off of the corresponding wide beam with cut-off of the headlamp, and vice versa.

Throughout the present disclosure, when a feature is described for the position of the cut-off edge, the same feature also can be applied to the position of the intersection of this cut-off edge with the cut-off of the corresponding wide beam with cut-off, and vice versa.

According to one feature of the invention, the asymmetry generated by the control law is brought about by a specific command intended for at least one of the means projecting the first focused light beam and the means projecting the second focused light beam. As will be explained hereafter, the specific command can equally involve an interruption of the angular pivoting, which is carried out by the control law by fixing the activations and deactivations of the luminous sources associated with the headlamp intended to be digitally controlled or an interruption of the lighting function fulfilled by the corresponding headlamp by deactivating all the luminous sources of the pixelated projection means of this headlamp. The specific command generated by the control law is used when a defined angle value of a focused light beam is reached.

According to another feature of the invention, the first focused light beam has a first beam width that is defined between a first cut-off edge forming an edge of the first focused light beam and a first end, with the second focused light beam having a second beam width that is defined between a second cut-off edge forming an edge of the second focused light beam and a second fixed end, with the first and second beam widths varying according to the number of activated luminous sources, with the first beam width and the second beam width varying independently of each other when the first focused light beam and the second focused light beam move between the first position and the second position of the light beam. The beam width of the first and second focused light beams is defined by the distance between, respectively, the first cut-off edge and the first fixed end and the second cut-off edge and the second fixed end of the first and second focused light beams, for example, when they are projected onto a vertical surface 25 meters from the vehicle.

According to one feature of the invention, the number of luminous sources of the pixelated projection means activated by the control law in order to generate each of the focused light beams varies according to information relating to a change of direction of the automotive vehicle. This information relating to the change of direction can originate, for example, from the angular position at the steering wheel or from the drift angle of the vehicle.

According to another feature of the invention, the control law is configured to activate or deactivate the luminous sources of at least one of the pixelated projection means, with the angular displacement of the corresponding focused light beam being implemented by gradually modifying the activated and deactivated luminous sources. The orientation of the first and second focused light beams is thus digitally controlled by the control law, by activating and/or deactivating certain luminous sources.

According to one feature of the invention, with the first focused light beam having a first cut-off edge that is inclined relative to the first optical axis and the second focused light beam having a second cut-off edge that is inclined relative to the second optical axis, the control law is configured to control the light beam so that the intersection of the first cut-off edge of the first focused light beam with the cut-off of the first wide light beam with cut-off moves from the first outer end position to the first inner end position, and so that the intersection of the second cut-off edge of the second focused light beam with the cut-off of the second wide light beam with cut-off moves from the second inner end position to the second outer end position.

According to one feature of the invention, with the first focused light beam having a first cut-off edge that is inclined relative to the cut-off of the first wide light beam with cut-off and the second focused light beam having a second cut-off edge that is inclined relative to the cut-off of the second wide light beam with cut-off, the control law is configured to control the light beam so that the intersection of the first cut-off edge of the first focused light beam with the cut-off of the first wide light beam with cut-off moves from the first outer end position to the first inner end position, and so that the intersection of the second cut-off edge of the second focused light beam with the cut-off of the second wide light beam with cut-off moves from the second inner end position to the second outer end position.

According to one feature of the invention, the angular displacement between the first outer end position and the first optical axis is greater than the angular displacement between the second outer end position and the second optical axis that is greater than or equal to the angular displacement between the second inner end position and the second optical axis, with the angular displacement between the first inner end position and the first optical axis being substantially equal to the angular displacement between the second inner end position and the second optical axis.

According to one feature of the invention, the angular displacement between the first outer end position and the first optical axis is 15°, the angular displacement between the second outer end position and the second optical axis is 9°, and the angular displacement between the second inner end position and the second optical axis is 6°, with the angular displacement between the first inner end position and the first optical axis also being 6°.

According to another feature of the invention, the control law is configured to control the light beam so that the first cut-off edge of the first focused light beam can move on either side of a central longitudinal axis of the luminous system extending at an equal distance from the two headlamps, from a first outer end position offset by 15° from the first side to a first inner end position offset by 6° from the second side, and the second cut-off edge of the second focused light beam can move on either side of this central longitudinal axis of the luminous system, from a second inner end position offset by 6° from the first side to a second outer end position offset by 9° from the second side of the automotive vehicle. In this case and hereafter, the angles are measured relative to the position of the focused light beam, and, for example, of the corresponding cut-off edge, relative to each of the optical axes specific to the headlamp associated with this focused light beam. Depending on whether the angle is on the first side or on the second side of the automotive vehicle, the indicated angle value is specified with the side on which the angle is located.

According to another feature of the invention, the angular displacement between the first outer end position and the first optical axis is greater than the angular displacement between the second outer end position and the second optical axis, than the angular displacement between the second inner end position and the second optical axis and than the angular displacement between the first inner end position and the first optical axis, with these last three angular displacements being substantially equal.

According to another feature of the invention, the angular displacement between the first outer end position and the first optical axis is 15°, with the angular displacement between the second outer end position and the second optical axis, the angular displacement between the second inner end position and the second optical axis, and the angular displacement between the first inner end position and the first optical axis being 6° for all three.

According to another feature of the invention, the control law of the light beam is configured to control the light beam so that the first cut-off edge of the first focused light beam can move on either side of a central longitudinal axis of the luminous system extending at an equal distance from the two headlamps, from a first outer end position offset by 15° from the first side to a first inner end position offset by 6° from the second side, and the second cut-off edge of the second focused light beam can move on either side of the central longitudinal axis of the luminous system, from a second inner end position offset by 6° from the first side to a second outer end position offset by 6° from the second side of the automotive vehicle.

According to another feature of the invention, the control law of the light beam interrupts, on the one hand, the angular pivoting of the first focused light beam when the first cut-off edge reaches the first inner end position offset by 6° relative to the central longitudinal axis of the luminous system, on the second side, and, on the other hand, the angular pivoting of the second focused light beam when the second cut-off edge reaches the second outer end position offset by 9° or 6°, relative to the central longitudinal axis of the luminous system, on the second side.

According to one feature of the invention, the control law of the light beam interrupts, on the one hand, the displacement of the first focused light beam when the first cut-off edge reaches the first inner end position shifted by a first determined value relative to the first optical axis and, on the other hand, the displacement of the second focused light beam when the second cut-off edge reaches the second outer end position shifted by a second determined value relative to the second optical axis, with the second value being equal to or greater than 3° of the first value.

According to one feature of the invention, the control law of the light beam firstly interrupts the displacement of the first focused light beam when the first cut-off edge reaches the first inner end position shifted by a first determined value and secondly interrupts the displacement of the second focused light beam when the second cut-off edge reaches the second outer end position shifted by a second determined value.

According to one feature of the invention, the control law of the light beam is configured to deactivate all the luminous sources of the pixelated projection means of the first headlamp when the first cut-off edge of the first focused light beam reaches the first inner end position.

According to another feature of the invention, the second focused light beam has a higher luminous intensity when the luminous sources of the pixelated projection means of the first headlamp are deactivated. The luminous intensity of the second focused light beam increases when the first cut-off edge reaches the angle value defined by the first inner end position of the first focused light beam and the luminous sources involved in generating the first focused light beam are deactivated, so that the overall luminous intensity of the light beam remains substantially constant and no significant variation in the intensity hinders the driver.

According to another feature of the invention, the control law of the light beam is configured to progressively deactivate the luminous sources of the pixelated projection means of the first headlamp, with the deactivation beginning when the first cut-off edge of the first focused light beam reaches a position that is offset by an angle R1 before the first inner end position, with the deactivation being complete when the first cut-off edge of the first focused light beam reaches the first inner end position. "Progressively deactivate" is understood herein to mean that the luminous flux of each luminous source decreases until a zero value is reached, following a continuously decreasing function.

According to one feature of the invention, a continuously decreasing function is a function of the angle of the position of the first cut-off edge of the first focused light beam.

According to another feature of the invention, the control law of the light beam is configured to progressively increase the luminous intensity of the second focused light beam when the luminous sources of the pixelated projection means of the first headlamp are progressively deactivated. Advantageously, the start of the increase is synchronized with the start of the aforementioned deactivation. Advantageously, the increase is complete, i.e., it compensates for the deactivation so that the overall luminous intensity of the light beam remains substantially constant, when the first cut-off edge of the first focused light beam reaches the first inner end position. "Progressively increasing" is understood herein to mean that the luminous flux of each luminous source increases, following a continuously increasing function.

According to one feature of the invention, the continuously increasing function is a function of the angle of the position of the second cut-off edge of the second focused light beam.

According to one feature of the invention, the deactivation and the increase are such that the overall luminous intensity of the light beam remains substantially constant throughout the progressive evolution of the respective fluxes and/or luminous intensities of the first and second light beams.

The progressive deactivation and increase ensure a smooth transition when transitioning from two switched on focused light beams to one only. This transition, which can hinder the driver, is then less perceptible.

According to one feature of the invention, the value of R1 ranges between 2 and 4°. These values ensure that a smooth enough transition is provided, and have the advantage of minimizing the time over which the luminous intensity of the second focused light beam is increased. A larger value of R1 would increase the heating-up of the luminous sources, which would be detrimental to their correct operation, and could even lead to their destruction.

BRIEF DESCRIPTION OF DRAWINGS

Further features, details and advantages of the invention will become more clearly apparent upon reading the following description, on the one hand, and from several embodiments that are provided by way of a non-limiting indication with reference to the appended schematic drawings, on the other hand, in which.

DETAILED DESCRIPTION OF THE INVENTION

Firstly, it should be noted that while the figures disclose the invention in detail for the implementation thereof, these figures clearly can be used to better define the invention, where appropriate. It also should be noted that these figures merely disclose embodiments of the invention.

The features, variants and various embodiments of the invention can be associated with one another, in various combinations, provided that they are not mutually incompatible or exclusive. Notably, it is possible to contemplate variants of the invention that comprise only a selection of the features described below, in isolation from the other described features, if this selection of features is sufficient to confer a technical advantage or to differentiate the invention from the prior art.

In the figures, the elements that are common to several figures use the same reference sign.

Furthermore, with reference to the figures, the longitudinal direction is depicted by the axis L and corresponds to the direction of travel of the vehicle, the vertical direction is depicted by the axis V and corresponds to the direction perpendicular to the ground over which the vehicle is traveling, and the transverse direction is depicted by the axis T and corresponds to the direction perpendicular to the longitudinal and vertical directions.

Figure 1:
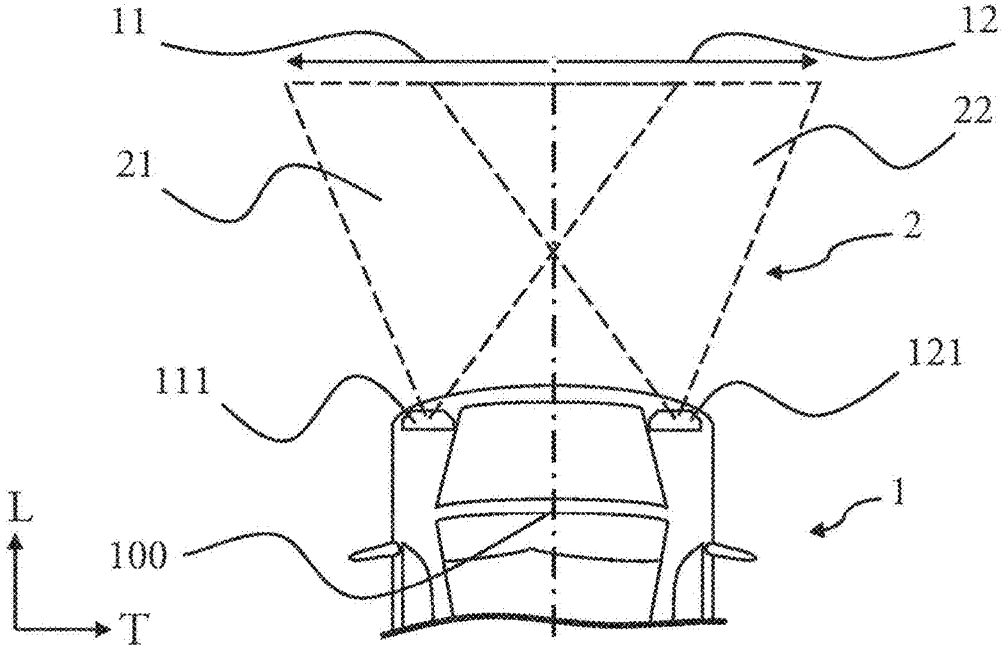
FIG. 1 schematically shows an automotive vehicle equipped with the luminous system.

FIG. 1 illustrates an automotive vehicle 1 equipped with a luminous system according to the invention. The automotive vehicle 1 has a median longitudinal axis 100 extending parallel to the main direction of the automotive vehicle 1 and separating the automotive vehicle 1 into a first side 11 and a second side 12, which are substantially equal. It should be noted that the first side 11 is systematically the side of the automotive vehicle 1 corresponding to the side where the driver of the automotive vehicle 1 is positioned. Thus, for automotive vehicles where the steering wheel and the driver are on the left, the first side is the left-hand side, in the forward travel direction of the automotive vehicle. For automotive vehicles where the steering wheel and the driver are on the right, the first side is the right-hand side, in the forward travel direction of the automotive vehicle. In the figures of the present application and the following detailed description, the first side 11 of the automotive vehicle 1 is the left-hand side in the forward travel direction of the automotive vehicle 1, but it should be noted that the description relating to this first side 11 applies, mutatis mutandis, whether this is the right-hand side or the left-hand side of the automotive vehicle 1.

The automotive vehicle 1 is equipped with a luminous system according to the invention comprising at least one first headlamp 111, disposed on the first side 11 and able to project a first light beam 21, and a second headlamp 121, disposed on the second side 12 and able to project a second light beam 22. The headlamps are disposed on either side of a central longitudinal axis of the luminous system, which notably can be coincident with the median longitudinal axis 100 of the automotive vehicle. The first light beam 21 and the second light beam 22 are complementary in order to generate a light beam 2. This light beam 2 allows the road on which the automotive vehicle 1 is traveling to be illuminated, for example, in order to guarantee optimum traveling conditions, notably at night, or even in order to be visible to other drivers. Each of the first and second headlamps 111 and 121 comprises a means for projecting a wide light beam with cut-off and a pixelated projection means for a focused light beam, with the combination of the wide light beam with cut-off and the focused light beam projected by the first headlamp 111 being involved in generating the first light beam 21, while the combination of the wide light beam with cut-off and the focused light beam projected by the second headlamp 121 is involved in generating the second light beam 22. More specifically, each light beam is formed by the wide light beam with cut-off, which has a wide field of illumination directly projected onto the road scene in front of the vehicle and which has a horizontal cut-off, and of the focused light beam, which has a reduced field of illumination in the extension of the horizontal cut-off, narrower than that of the field of illumination of the wide light beam with cut-off, notably to ensure that the focused light beam is high definition.

It should be noted that the wide light beam with cut-off also can be pixelated in an alternative embodiment. The focused light beam differs in this case with a resolution that is greater than that of the wide light beam with cut-off and a field of illumination of each pixel that is narrower than that associated with the wide light beam with cut-off. By way of a non-limiting example, the field of illumination of each pixel generating the wide light beam with cut-off can be of the order of 5° as a minimum, while the field of illumination of the pixels generating the focused light beam is less than 3°.

The pixelated projection means is provided with a plurality of selectively activatable luminous sources, with each luminous source producing a light ray forming the focused light beam. It is understood that the focused light beam is formed by a plurality of light rays equal to the number of luminous sources producing a light ray, i.e., activated. The pixelated projection means comprises at least 20,000 luminous sources, with this significant number of luminous sources allowing a pixelated light beam to be projected with very high resolution.

Each of the luminous sources, and notably the luminous sources involved in generating the focused light beam, is able to be activated or deactivated by means of a control law, in order to generate or not generate one of the light rays. This control law allows the pixelated projection means to project a focused light beam that is able to move angularly. In this way, the control law for managing the angular displacement of at least each of the focused light beams allows a directional lighting function to be provided that allows the light beam 2 to be oriented between a first position and a second position, according to information relating, for example, to the change of direction of the automotive vehicle 1, or even to the steering wheel angle. The directional lighting function is thus implemented digitally via the control law, with the change in orientation of the focused light beams that is brought about by a change in the activation or the deactivation of some of the luminous sources being involved in generating the corresponding focused light beam.

Figure 2:
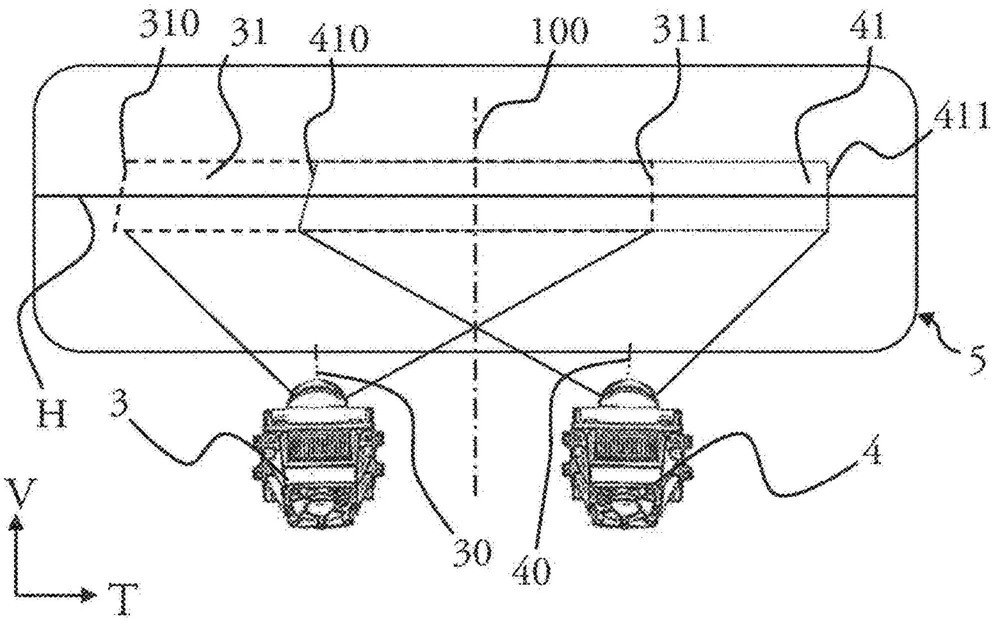
FIG. 2 schematically shows a light beam emitted by two headlamps of the automotive vehicle of FIG. 1.

FIG. 2 illustrates two pixelated projection means 3 and 4 located, when they are installed in the automotive vehicle 1, in the first headlamp 111 and in the second headlamp 121, respectively. These two pixelated projection means 3 and 4 respectively generate a first focused light beam 31 and a second focused light beam 41, which, in the embodiment shown in FIG. 2, are projected onto a vertical surface 5 to 25 m from the vehicle in order to schematically illustrate the light beam as it would be projected onto the road in front of a vehicle equipped with such pixelated projection means. The line H extending transversely depicts the horizon line below which the wide light beam with cut-off is projected by projection means (not shown herein) and which substantially corresponds to the horizontal cut-off of the light beam with wide cut-off.

The median longitudinal axis 100 of the automotive vehicle 1 is, in this case, schematically depicted substantially at the center of the vertical surface 5 and it should be noted that in a standard position of the vehicle, as illustrated in FIG. 2, i.e., not implementing a directional lighting function, the focused light beams are involved in generating a light beam extending in like manner to the left and to the right of the median longitudinal axis 100. It should be noted that the lighting system is adjusted so that the first and second light beams projected onto the road infinitely coincide, but that these beams have a transverse offset relative to one another when they are projected onto a vertical surface 5 to 25 meters away, due to the transverse spacing of the headlamps on the vehicle. In each depiction illustrated in the figures, and which are described hereafter, the angular positioning of the light beams is relative to the optical axis of the corresponding headlamp.

Thus, the first focused light beam 31 generated by the pixelated projection means of the first headlamp extends on either side of a first optical axis 30 associated with this first headlamp. This first optical axis 30 is oriented in the direction of propagation of the first focused light beam 31 and forms the central axis of the first focused light beam 31 when the vehicle is traveling in a straight line and the light beam has a nominal orientation. Like the first focused light beam 31, the second focused light beam 41 extends on either side of a second optical axis 40 associated with the second headlamp.

The first focused light beam 31 extends transversely between an end forming a first cut-off edge 310 and a first fixed end 311, which in this case is set up so as to be positioned 8° from the first optical axis of the second side 12, while the second light beam extends transversely between an end forming a second cut-off edge 410 and a second fixed end 411, which in this case is set up so as to be positioned 15° from the second optical axis of the second side 12. In this context, the first focused light beam has a first beam width that is defined between the first cut-off edge 310 and the first fixed end 311, while the second focused light beam has a second beam width that is defined between the second cut-off edge 410 and the second fixed end 411.

The fixed ends 311, 411 are fixed relative to the optical axis corresponding to each headlamp, notably due to the high-definition implementation of the pixelated function, i.e., with a defined number of luminous sources over a given angular range. As a result, the width of these pixelated beams is likely to vary as a function of the position of the cut-off relative to the corresponding fixed end.

These first and second cut-off edges 310 and 410 form the edge of the corresponding focused light beam oriented toward the first side 11 of the vehicle, with an inclination relative to the optical axis of the corresponding headlamp that helps to prevent dazzling road users traveling in the opposite direction to the vehicle equipped with the headlamps according to the invention. In addition or alternatively, the first and second cut-off edges 310 and 410 have an inclination relative to the cut-off of the corresponding wide light beam with cut-off.

The control law allows the orientation of the first and second focused light beams 31 and 41 to be modified by activating or deactivating the luminous sources so as to transversely displace these first and second cut-off edges 310 and 410. The control law thus allows the position of the first cut-off edge 310 to be modulated between a first outer end position P1ext and a first inner end position P1int, and allows the position of the second cut-off edge 410 to be modulated between a second inner end position P2int and a second outer end position P2ext. For each of the focused light beams projected by a given pixelated projection means, the inner end position P1int, P2int of the cut-off of this focused light beam must be understood to be the end position oriented toward the other pixelated projection means, i.e., toward the inside of the vehicle, while the outer end position P1ext, P2ext of the cut-off of this focused light beam must be understood to be the end position oriented away from the other pixelated projection means, i.e., toward the outside of the vehicle. In the case shown in the figures of a vehicle with the steering wheel and the driver on the left of the vehicle, the first inner end position P1int of the cut-off of the first focused light beam is the right-hand end position of the beam, while the first outer end position P1ext of this cut-off is the left-hand end position of the beam, but it should be noted that this will be the inverse left/right for a vehicle with the steering wheel and the driver on the left of the vehicle.

Figure 3:
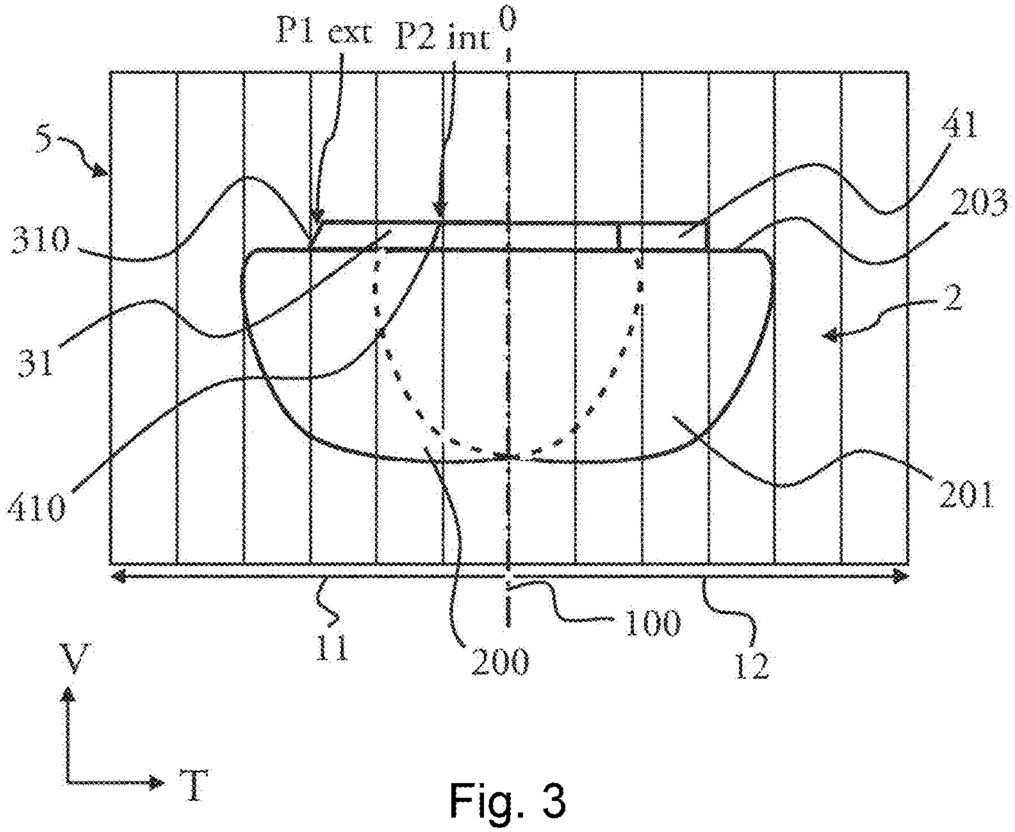
FIG. 3 schematically shows the light beam projected onto a vertical surface at a distance from the vehicle and in which the position of a first cut-off edge of the beam emitted by a first headlamp is in the vicinity of a first outer end and the position of a second cut-off edge of the beam emitted by a second headlamp is in the vicinity of a second inner end.

FIG. 3 more specifically illustrates the light beam 2 projected onto the vertical surface 5. This vertical surface 5 in this case has a marking for determining the angular position of the first and second cut-off edges 310, 410 of the pixelated light beams projected onto the vertical surface 5, relative to the optical axis of each of the headlamps intended to project these beams. The light beam 2, as it is projected in this case onto the vertical surface 5, has a first wide light beam with cut-off 200 and a second wide light beam with cut-off 201, which form a wide portion of the beam, commonly called "flat" portion, and intended to illuminate the road scene in direct proximity to the vehicle and having a horizontal cut-off 203, so as to avoid dazzling the other road users, with this wide portion of the beam being supplemented by a narrower upper portion, commonly called "kink" portion and formed by combining the first focused light beam 31 and the second focused light beam 41.

FIG. 3 illustrates the first position of the light beam when the vehicle negotiates a corner on the side of the driver, with this first position of the light beam being obtained by the directional lighting function in order to illuminate the inside of the corner. This first position of the light beam is obtained by modifying the angular position of the focused light beams, in this case by keeping the wide light beams with cut-off fixed. In order to form the first position of the light beam, the two focused light beams are positioned digitally, via the control law, in an end position oriented toward the inside of the corner, namely, in this case, in a first outer end position P1ext for the first focused light beam and in a second inner end position P2int for the second focused light beam. The first cut-off edge 310 is located in the vicinity of the first outer end P1ext with an angular orientation of 15° relative to the first optical axis, on the first side 11. The second cut-off edge 410 is located in the vicinity of the second inner end P2int with an orientation of 6° relative to the second optical axis, also on the first side 11. It should be noted that if the angle of the first or second cut-off edges 310 and 410 relative to the corresponding optical axis is considered to be the angular spacing between the light ray forming the cut-off emitted by the corresponding pixelated projection means and the longitudinal direction parallel to the corresponding optical axis, it can be depicted in the figures as a function of the median longitudinal axis 100, which forms an axis of symmetry of the luminous system when it is installed on the vehicle.

It should be noted that, for a vehicle with the steering wheel and the driver on the left of the vehicle, as described in detail herein, the angular positions of the first outer end position P1ext of the first cut-off edge 310 and of the second inner end position P2int of the second cut-off edge 410, respectively at 15° and 6° relative to the corresponding optical axis, remain unchanged in each of the various embodiments that will be described, when the light beam has the first position oriented toward the inside of a corner to the left of the vehicle.

Figure 4:
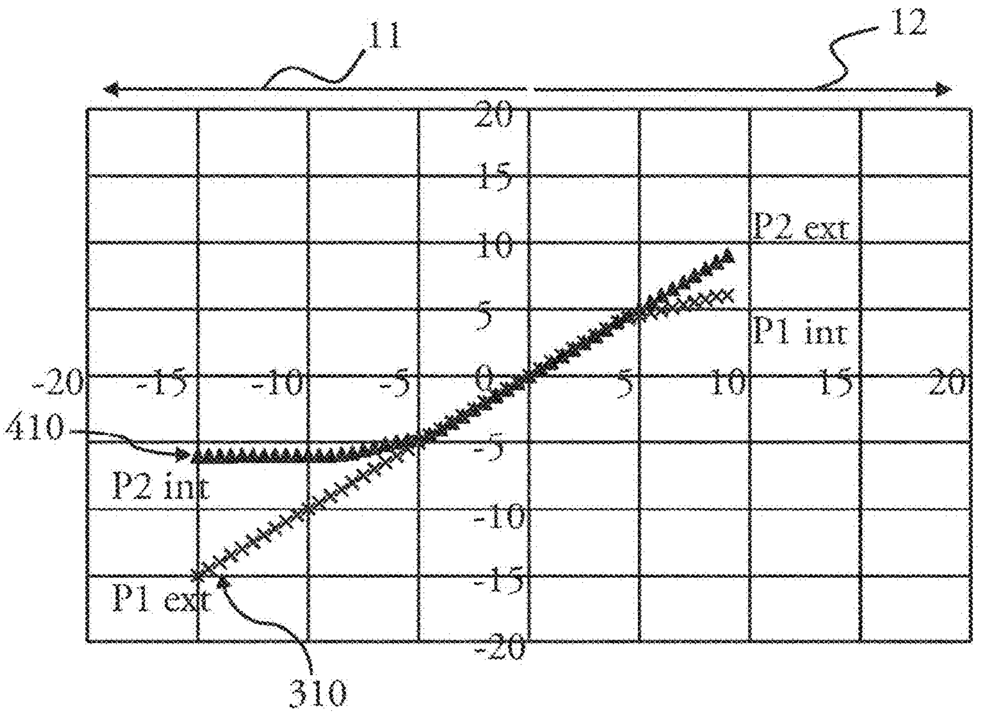
FIG. 4 graphically shows the angular displacement of the first and second cut-off edges according to an embodiment of the control law controlling the lighting system according to the invention.

FIG. 4 graphically illustrates the control law according to a first embodiment, so that it controls the angular position of the first and second cut-off edges 310 and 410 relative to the corresponding optical axis according to this first embodiment, as a function of the angle of inclination of the steering wheel of the automotive vehicle 1.

The various angular positions of the first and second cut-off edges 310 and 410, respectively illustrated by crosses and triangles in FIG. 4, are defined by the control law, which ensures, according to the invention, asymmetry of the displacement of the light beam between either side relative to the central axis of the luminous system according to the invention, i.e., the median longitudinal axis 100 of the vehicle when the luminous system is fitted on the vehicle. This asymmetry that is brought about by the control law is due to an interruption of the angular displacement of the focused light beams when the angle of the first cut-off edge 310 relative to the first optical axis 30 reaches a limit position of 6° on the second side 12 and when the angle of the second cut-off edge 410 relative to the second optical axis 40 reaches 9° on the second side 12. In this way, it can be seen that the light beam has, when the corner is on the driver side, a first position relative to the median longitudinal axis of the vehicle, on the first side 11, which is of the order of 15°, defined by the first outer end position P1ext of the first cut-off edge 310, and that this light beam has, when the corner is on the passenger side, a second position relative to the median longitudinal axis, on the second side 11, which is of the order of 9°, defined by the second outer end position P2ext of the second cut-off edge 410.

Figure 5:
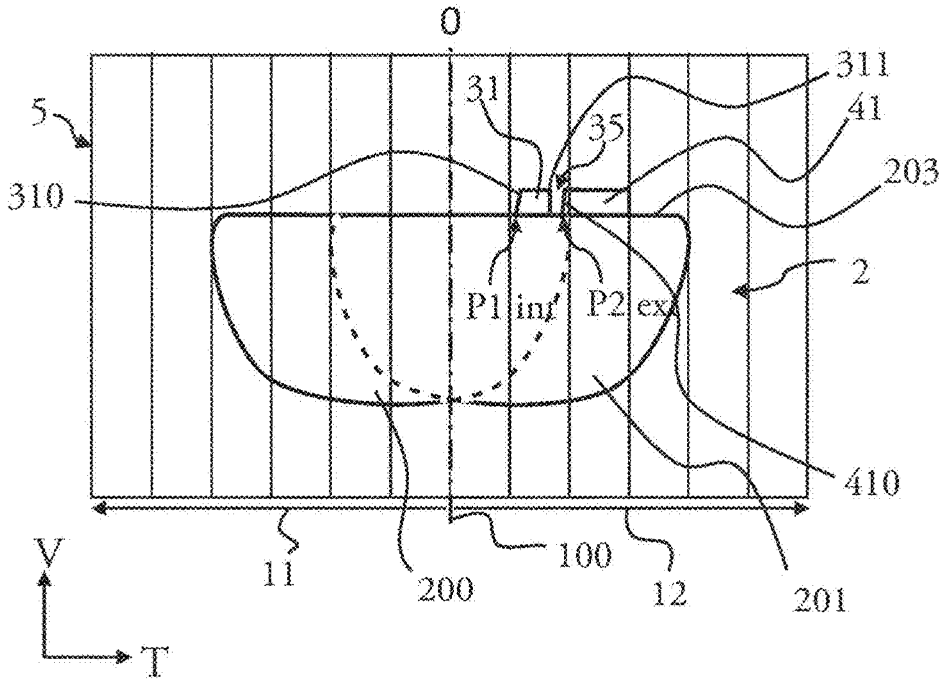
FIG. 5 schematically shows the light beam projected onto a vertical surface in which the position of the first cut-off edge is in the vicinity of the first outer end and the position of the second cut-off edge is in the vicinity of the second outer end according to the embodiment of the control law of FIG. 4.

FIG. 5 schematically illustrates the first and second focused light beams 31 and 41 projected onto the vertical surface 5, in a second position of the light beam 2, when the vehicle negotiates a corner on the opposite side to the driver, according to the first embodiment of the control law as illustrated in FIG. 4. The interruption of the pivoting of the light beam and of the focused light beams involved in forming it, generated by the control law, is such that, on the one hand, the first cut-off edge 310 of the first focused light beam is in a first inner end position P1ext offset by 6° relative to the first optical axis 30, on the second side 12 of the automotive vehicle 1 and, on the other hand, the second cut-off edge 410 of the second focused light beam is in a second outer end position P2ext offset by 9° relative to the second optical axis 40, on the second side 12 of the automotive vehicle 1.

Thus, it will be understood that in this first embodiment, as can also be understood from FIG. 4, that the first cut-off edge 310 is able to move, on either side of the median longitudinal axis, from 15° on the first side 11 to 6° on the second side 12, and that the second cut-off edge 410 is able to move, on either side of the median longitudinal axis, from 6° on the first side 11 to 9° on the second side 12, with the angular displacement of the first and second cut-off edges 310 and 410 varying according to the change of trajectory of the automotive vehicle 1.

The angular displacement of the light beam is thus rendered asymmetrical on either side of the central longitudinal axis of the luminous system, or of the median longitudinal axis of the vehicle, by appropriately controlling the focused light beams, and notably by interrupting the pivoting of the focused light beam disposed on the opposite side to the steering wheel and the driver. Both FIG. 4 and FIG. 5 show that, in the second position of the light beam, the angular spacing between the first cut-off edge and the second cut-off edge, in this case 3°, is reduced compared to the angular spacing between these two cut-offs in the first position of the light beam, in this case 6°.

By way of a reminder, the first end 311 of the first pixelated light beam is fixed and in this case is located 8° from the first optical axis, on the second side, so that a dark region 35 is formed between the two focused light beams, between the first end 311 of the first pixelated light beam and the second cut-off edge 410 of the second pixelated light beam.

Thus, the asymmetry generated by the control law, and notably the interruption of the angular displacement of the focused light beams, avoids, during a change of direction toward the second side 12 of the automotive vehicle 1, hindering the driver by offering a dark region 35 between the first focused light beam 31 and the second focused light beam 41 with a reduced width of 1°.

Figure 6:
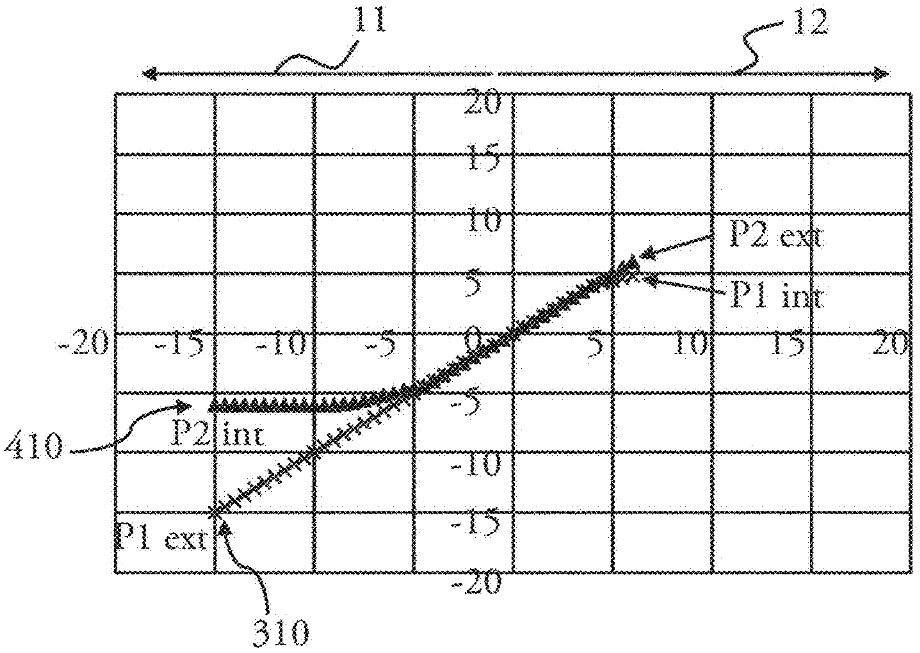
FIG. 6 graphically shows the angular displacement of the first and of the second cut-off edge according to another embodiment of the control law.

FIG. 6 graphically illustrates the control law according to a second embodiment, which differs from the previous description in that the pivoting of the focused light beams is interrupted earlier than in the first embodiment, within the context of a corner on the side opposite the driver, notably in order to further reduce and advantageously eliminate the dark region between the focused light beams. More specifically, the control law is such that the displacement of the first focused light beam 31 is interrupted when the first cut-off edge 310 reaches its limit position 6° on the second side 12, as before, and such that the displacement of the second focused light beam 41 is interrupted as soon as the angle of the second cut-off edge relative to the second optical axis reaches this same position of 6° on the second side 12. In this embodiment, the first inner end of the first focused light beam 31 and the second outer end of the second focused light beam 41 are substantially superimposed and the two focused light beams locally overlap over the 2° over which the first focused light beam extends. Thus, during a significant change of trajectory of the automotive vehicle 1 toward the second side 12, the first and second focused light beams 31 and 41 generate a continuous focused beam without a dark region.

Figure 7:
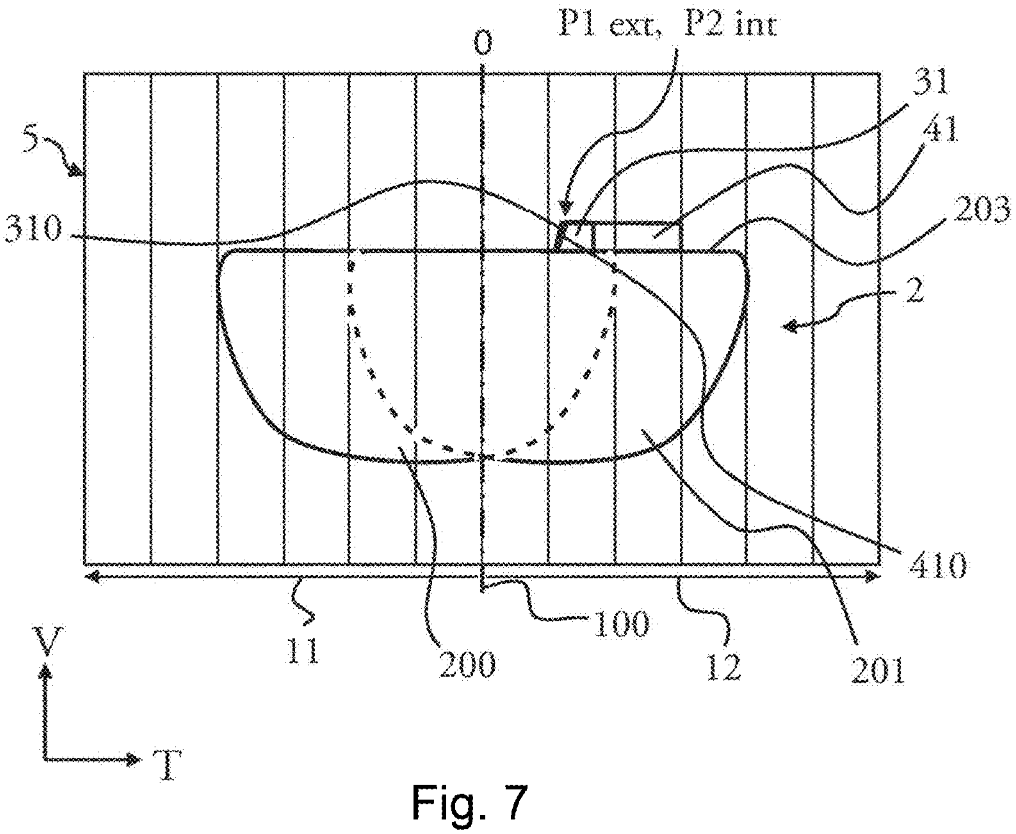
FIG. 7 schematically shows the light beam projected onto a vertical surface in which the position of the first cut-off edge is in the vicinity of the first inner end and the position of the second cut-off edge is in the vicinity of the second outer end according to the embodiment of the control law of FIG. 6.

FIG. 7 schematically illustrates the first and second focused light beams 31 and 41 projected onto the vertical surface 5, in a second position of the light beam 2, when the vehicle negotiates a corner on the side opposite the driver, according to the embodiment of FIG. 6. The interruption of the pivoting of the light beam and of the focused light beams involved in forming it, generated by the control law, is such that, on the one hand, the first cut-off edge 310 is in a first inner end position P1ext at 6° relative to the first optical axis, on the second side 12 of the automotive vehicle 1 and, on the other hand, the second cut-off edge 410 of the second focused light beam is in a second outer end position P2ext equal to the first outer end position P1ext, i.e., at 6° relative to the corresponding optical axis, on the second side 12 of the automotive vehicle 1.

Thus, it is understood that, in this second embodiment, as was also understood from FIG. 6, the first cut-off edge 310 is able to move, on either side of the median longitudinal axis, from 15° on the first side 11 to 6° on the second side 12, and that the second cut-off edge 410 is able to move, on either side of the median longitudinal axis, from 6° on the first side 11 to 6° on the second side 12, with the angular displacement of the first and second cut-off edges 310 and 410 varying according to the change of trajectory of the automotive vehicle 1.

Once again, the angular displacement of the light beam is thus rendered asymmetrical on either side of a longitudinal axis by appropriately controlling the focused light beams, and notably by interrupting the pivoting of the focused light beam disposed on the opposite side to the steering wheel and the driver. Both FIG. 6 and FIG. 7 show that, in the second position of the light beam, the angular spacing between the first cut-off edge and the second cut-off edge, in this case substantially zero, is reduced compared to the angular spacing between these two cut-offs in the first position of the light beam, in this case 6°.

Thus, the asymmetry generated by the control law, and notably the interruption of the angular displacement of the focused light beams, avoids, during a change of direction toward the second side 12 of the automotive vehicle 1, hindering the driver by offering continuous lighting between the first focused light beam 31 and the second focused light beam 41.

Figure 8:
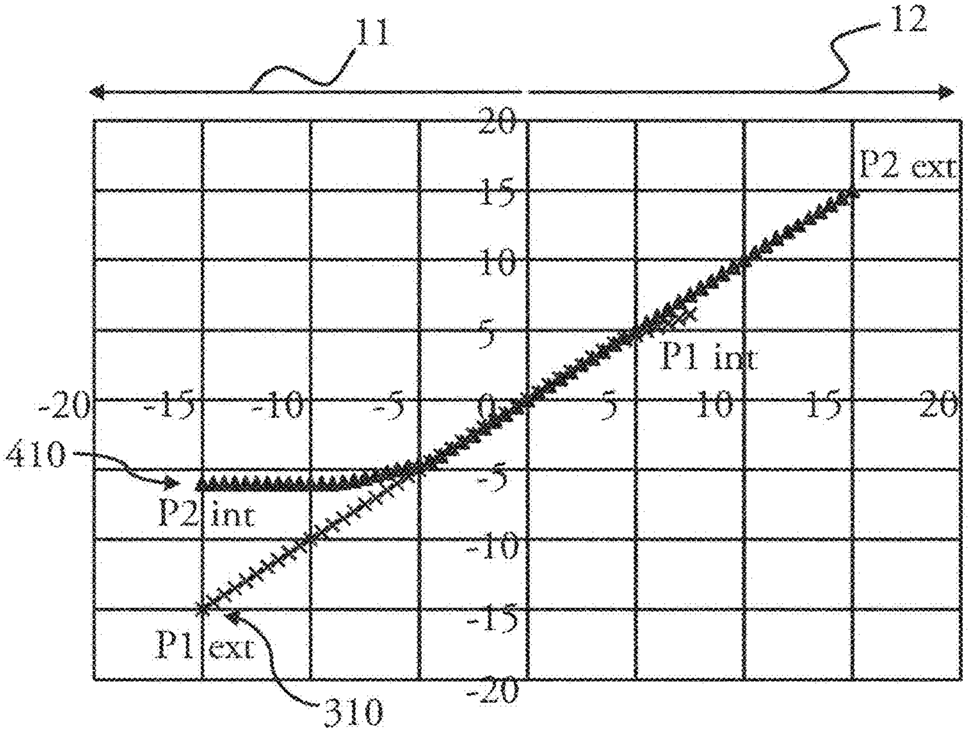
FIG. 8 graphically shows the angular displacement of the first and second cut-off edges according to another embodiment of the control law.

FIG. 8 illustrates a third embodiment that differs from the above in that one of the focused light beams, namely the focused light beam on the side opposite the steering wheel and the driver, continues to pivot angularly, in a digital manner via the control law and the activation/deactivation of the appropriate luminous sources, as has been described until now, while the other focused light beam is turned off beyond a certain angular position.

More specifically, when the first cut-off edge 310 reaches an angular position equal to 6° on the second side 12, the control law deactivates all the luminous sources of the first pixelated projection means 3 generating the first focused light beam and the first cut-off edge 310, while the second cut-off edge 410 is digitally controlled by angular pivoting without interruption until it reaches 15° on the second side 12. This thus ensures that when the second cut-off edge exceeds the limit position of 8° on the second side 12, as referred to as the angular position of the first fixed end 311, the first light beam is cut to avoid generating a dark band.

Figure 9:
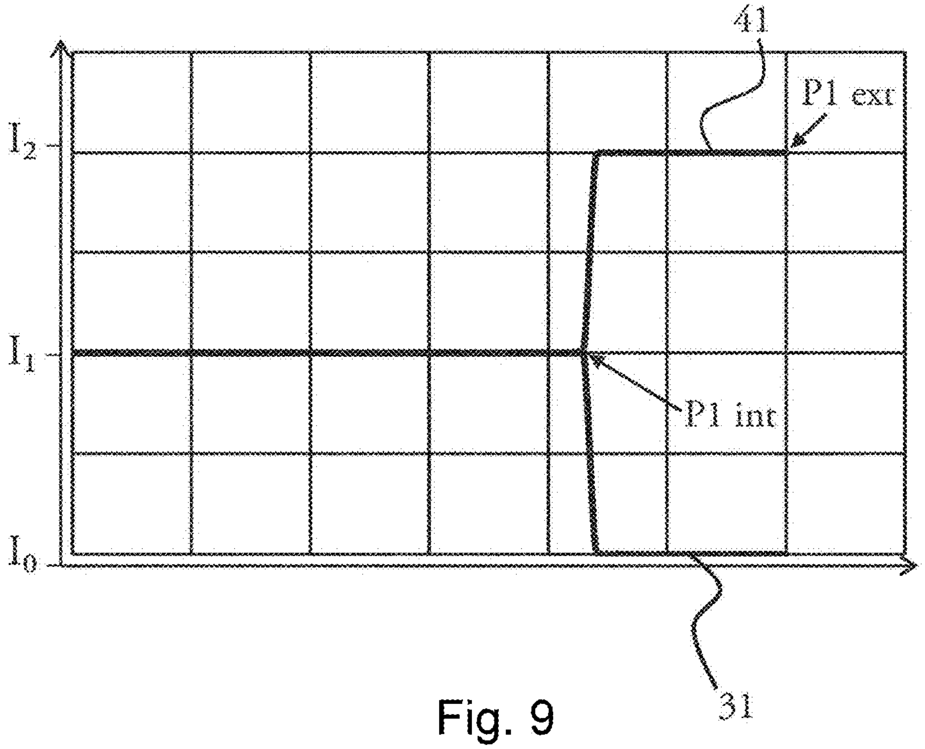
FIG. 9 graphically shows the change in intensity of the first and second focused light beams according to the embodiment of the control law of FIG. 8.

Moreover, as shown in FIG. 9, the luminous intensity of the second focused light beam 41 can increase simultaneously with the deactivation of the luminous sources forming the first focused light beam 31. When the luminous sources of the first and second pixelated light beams 31 and 41 are activated together, each of the first and second pixelated light beams 31 and 41 has a luminous intensity with a first value I1. When the first cut-off edge 310 reaches its limit position on the second side 12, the luminous sources of the pixelated projection means 3 of the first headlamp 111 are deactivated by the control law, so that the luminous intensity of the first focused light beam 31 assumes a zero value I0. Concomitantly, the luminous intensity of the second focused light beam 41 increases, by substantially double so as to assume a second value 12, so that the users of the automotive vehicle 1 observe a continuous intensity and are not hindered when turning off the first focused light beam with respect to the displacement of the light beam 2.

The invention, as described above, does indeed achieve its stated aims by proposing a luminous system comprising two pixelated projection modules able to provide a digital directional lighting function for which the focused light beams form a continuity when they move between a first position and a second position of the light beam. Variants that are not described herein can be implemented without departing from the context of the invention, provided that, in accordance with the invention, they include a dehumidification method according to the invention.

What is claimed is:

1. A luminous system for an automotive vehicle comprising:

a first projector configured to be mounted on a first side of the automotive vehicle, the first projector configured to project a first light beam;

a second projector configured to be mounted on a second side of the automotive vehicle, the second projector configured to project a second light beam, with the first and second light beams being complementary so as to form a road light beam;

the road light beam being controlled by a control law from a controller from the automotive vehicle, each projector projects a wide light beam with a cut-off and a pixelated projection means by selectively activated luminous sources for projecting a focused light beam;

the first light beam being formed by a first focused light beam having a first optical axis and a first wide light beam with cut-off, the second light beam being formed by a second focused light beam having a second optical axis and a second wide light beam with cut-off, the first focused light beam being controlled by the control law in order to pivot between a first outer end position and a first inner end position on either side of the first optical axis, the second focused light beam being digitally controlled by the control law in order to pivot between a second inner end position and a second outer end position on either side of the second optical axis, wherein the control law is configured to generate asymmetry between an angular displacement of the first focused light beam from the first outer end position to the first inner end position relative to the first optical axis;

an angular displacement of the second focused light beam from the second outer end position to the second inner end position relative to the second optical axis, with the first focused light beam having a first cut-off edge inclined relative to the first optical axis and the second focused light beam having a second cut-off edge inclined relative to the second optical axis, wherein the control law is configured to control the light beam so that the intersection of the first cut-off edge of the first focused light beam with the cut-off of the first wide light beam with the cut-off moves from the first outer end position to the first inner end position, such that the intersection of the second cut-off edge of the second focused light beam with the cut-off of the second wide light beam with cut-off moves from the second inner end position to the second outer end position, wherein the angular displacement between the first outer end position and the first optical axis is greater than the angular displacement between the second outer end position and the second optical axis that is greater than or equal to the angular displacement between the second inner end position and the second optical axis, with the angular displacement between the first inner end position and the first optical axis being substantially equal to the angular displacement between the second inner end position and the second optical axis, and wherein the angular displacement between the first outer end position and the first optical axis is greater than the angular displacement between the second outer end position and the second optical axis, than the angular displacement between the second inner end position and the second optical axis and than the angular displacement between the first inner position end and the first optical axis, with these last three angular displacements being substantially equal.

2. The luminous system as claimed in claim 1, wherein the number of luminous sources of the pixelated projection means activated by the control law for generating each of the focused light beams varies according to information relating to a change of direction of the automotive vehicle.

3. The luminous system as claimed in claim 2, wherein the control law is configured to activate or deactivate the luminous sources of at least one of the pixelated projection means, with the angular displacement of the corresponding focused light beam being implemented by gradually modifying the activated and deactivated luminous sources in a gradual manner.

4. The luminous system as claimed in claim 1, wherein the control law of the light beam interrupts the displacement of the first focused light beam when the first cut-off edge reaches the first inner end position that is shifted by a first determined value relative to the first optical axis and the displacement of the second focused light beam when the second cut-off edge reaches the second outer end position that is shifted by a second determined value relative to the second optical axis, with the second value being equal to or greater than 3 degrees of the first determined value.

5. The luminous system as claimed in claim 1, wherein the control law of the light beam initially interrupts a displacement of the first focused light beam when the first cut-off edge reaches the first inner end position that is shifted by a first determined value and thereafter interrupts a displacement of the second focused light beam when the second cut-off edge reaches the second outer end position that is shifted by a second determined value.

6. The luminous system as claimed in claim 1, wherein the control law of the light beam is configured to deactivate all the luminous sources of the pixelated projection means of the first projector when the first cut-off edge of the first focused light beam reaches the first inner end.

7. The luminous system as claimed in claim 6, wherein the second focused light beam has a higher luminous intensity when the luminous sources of the pixelated projection means of the first projector are deactivated.

8. A luminous system for an automotive vehicle comprising:

a first projector configured to be mounted on a first side of the automotive vehicle, the first projector configured to project a first light beam;

a second projector configured to be mounted on a second side of the automotive vehicle, the second projector configured to project a second light beam, with the first and second light beams being complementary so as to form a road light beam;

the road light beam being controlled by a control law from a controller from the automotive vehicle, each projector projects a wide light beam with a cut-off and a pixelated projection means by selectively activated luminous sources for projecting a focused light beam;

the first light beam being formed by a first focused light beam having a first optical axis and a first wide light beam with cut-off, the second light beam being formed by a second focused light beam having a second optical axis and a second wide light beam with cut-off, the first focused light beam being controlled by the control law in order to pivot between a first outer end position and a first inner end position on either side of the first optical axis, the second focused light beam being digitally controlled by the control law in order to pivot between a second inner end position and a second outer end position on either side of the second optical axis, wherein the control law is configured to generate asymmetry between an angular displacement of the first focused light beam from the first outer end position to the first inner end position relative to the first optical axis;

an angular displacement of the second focused light beam from the second outer end position to the second inner end position relative to the second optical axis, and wherein the control law of the light beam initially interrupts a displacement of the first focused light beam when the first cut-off edge reaches the first inner end position that is shifted by a first determined value and thereafter interrupts a displacement of the second focused light beam when the second cut-off edge reaches the second outer end position that is shifted by a second determined value.

9. The luminous system as claimed in claim 8, wherein the number of luminous sources of the pixelated projection means activated by the control law for generating each of the focused light beams varies according to information relating to a change of direction of the automotive vehicle.

10. The luminous system as claimed in claim 9, wherein the control law is configured to activate or deactivate the luminous sources of at least one of the pixelated projection means, with the angular displacement of the corresponding focused light beam being implemented by gradually modifying the activated and deactivated luminous sources in a gradual manner.

11. The luminous system as claimed in claim 8, wherein the control law of the light beam interrupts the displacement of the first focused light beam when the first cut-off edge reaches the first inner end position that is shifted by a first determined value relative to the first optical axis and the displacement of the second focused light beam when the second cut-off edge reaches the second outer end position that is shifted by a second determined value relative to the second optical axis, with the second value being equal to or greater than 3 degrees of the first determined value.

12. The luminous system as claimed in claim 8, wherein the control law of the light beam is configured to deactivate all the luminous sources of the pixelated projection means of the first projector when the first cut-off edge of the first focused light beam reaches the first inner end.

13. The luminous system as claimed in claim 12, wherein the second focused light beam has a higher luminous intensity when the luminous sources of the pixelated projection means of the first projector are deactivated.

14. A luminous system for an automotive vehicle comprising:

a first projector configured to be mounted on a first side of the automotive vehicle, the first projector configured to project a first light beam;

a second projector configured to be mounted on a second side of the automotive vehicle, the second projector configured to project a second light beam, with the first and second light beams being complementary so as to form a road light beam;

the road light beam being controlled by a control law from a controller from the automotive vehicle, each projector projects a wide light beam with a cut-off and a pixelated projection means by selectively activated luminous sources for projecting a focused light beam;

the first light beam being formed by a first focused light beam having a first optical axis and a first wide light beam with cut-off, the second light beam being formed by a second focused light beam having a second optical axis and a second wide light beam with cut-off, the first focused light beam being controlled by the control law in order to pivot between a first outer end position and a first inner end position on either side of the first optical axis, the second focused light beam being digitally controlled by the control law in order to pivot between a second inner end position and a second outer end position on either side of the second optical axis, wherein the control law is configured to generate asymmetry between an angular displacement of the first focused light beam from the first outer end position to the first inner end position relative to the first optical axis;

an angular displacement of the second focused light beam from the second outer end position to the second inner end position relative to the second optical axis, and wherein the control law of the light beam is configured to deactivate all the luminous sources of the pixelated projection means of the first projector when the first cut-off edge of the first focused light beam reaches the first inner end.

15. The luminous system as claimed in claim 14, wherein the number of luminous sources of the pixelated projection means activated by the control law for generating each of the focused light beams varies according to information relating to a change of direction of the automotive vehicle.

16. The luminous system as claimed in claim 15, wherein the control law is configured to activate or deactivate the luminous sources of at least one of the pixelated projection means, with the angular displacement of the corresponding focused light beam being implemented by gradually modifying the activated and deactivated luminous sources in a gradual manner.

17. The luminous system as claimed in claim 14, wherein the control law of the light beam interrupts the displacement of the first focused light beam when the first cut-off edge reaches the first inner end position that is shifted by a first determined value relative to the first optical axis and the displacement of the second focused light beam when the second cut-off edge reaches the second outer end position that is shifted by a second determined value relative to the second optical axis, with the second value being equal to or greater than 3 degrees of the first determined value.

18. The luminous system as claimed in claim 14, wherein the control law of the light beam initially interrupts a displacement of the first focused light beam when the first cut-off edge reaches the first inner end position that is shifted by a first determined value and thereafter interrupts a displacement of the second focused light beam when the second cut-off edge reaches the second outer end position that is shifted by a second determined value.

19. The luminous system as claimed in claim 14, wherein the second focused light beam has a higher luminous intensity when the luminous sources of the pixelated projection means of the first projector are deactivated.

* * * * *